J. H. HALL.
ELECTRIC CONTROLLER.
APPLICATION FILED OCT. 30, 1911. RENEWED MAY 25, 1915.
1,175,441.  Patented Mar. 14, 1916.
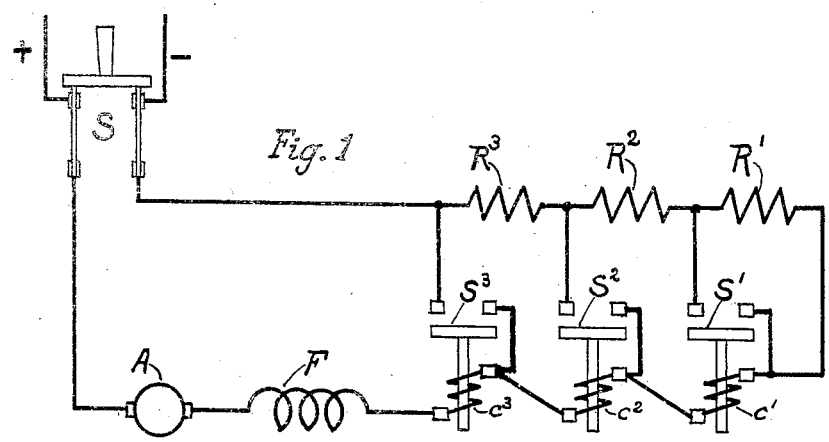
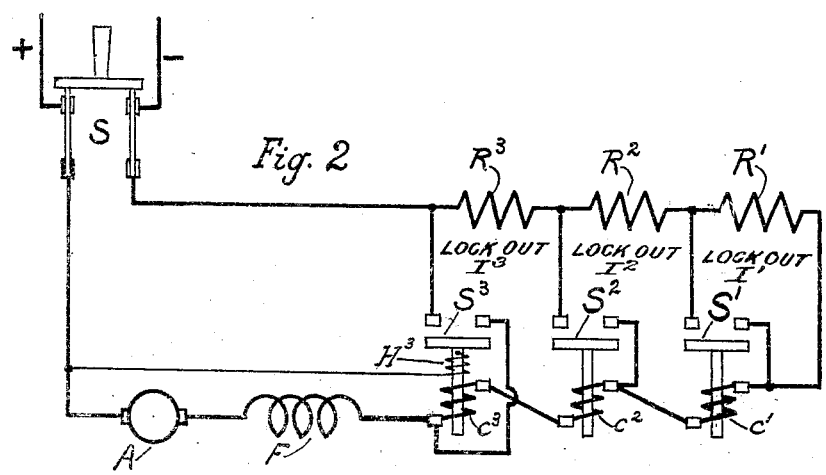
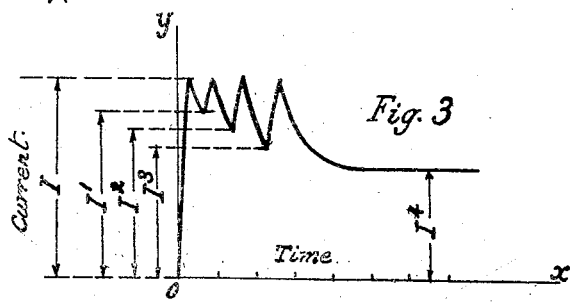
WITNESSES
INVENTOR
Jay H. Hall
BY F. N. Barber
ATTORNEY

UNITED STATES PATENT OFFICE.

JAY H. HALL, OF CLEVELAND, OHIO, ASSIGNOR TO THE ELECTRIC CONTROLLER AND MANUFACTURING COMPANY, OF CLEVELAND, OHIO, A CORPORATION OF OHIO.

ELECTRIC CONTROLLER.

REISSUED

1,175,441.   Specification of Letters Patent.   Patented Mar. 14, 1916.

Application filed October 30, 1911, Serial No. 657,496. Renewed May 25, 1915. Serial No. 30,463.

*To all whom it may concern:*

Be it known that I, JAY H. HALL, a citizen of the United States, residing at Cleveland, in the county of Cuyahoga and State of Ohio, have invented new and useful Improvements in Electric Controllers, of which the following is a specification.

My invention relates to automatic controllers for electric motors wherein the operation of the resistance-controlling switches is governed by the current flowing in the motor circuit.

It is one of the objects of my invention to provide a motor-controller having resistance-controlling switches energized by the current in the motor circuit, and adapted to lock open when the current is above a certain predetermined limit and to operate when the current decreases below that limit, the said switches being further adjusted to lock out at different values of current in the motor circuit.

Referring to the accompanying drawing, Figure 1 is a diagrammatic view embodying my invention; Fig. 2, a modification thereof; and Fig. 3, a curve showing the values of current for locking out the successively-closing switches.

Referring to Fig. 1, S indicates a line switch, A the armature of the motor to be controlled, and F the series field thereof. Sections of starting resistance are shown at $R'$, $R^2$, $R^3$ which are controlled, respectively, by the switches $S'$, $S^2$, and $S^3$, their respective operating windings $c'$, $c^2$, and $c^3$ being all in series in the motor circuit and energized by the current therein. The switches $S'$, $S^2$, and $S^3$ are of that type of switch described in Harry R. Canfield's applications, Serial Number 583,000, filed September 21, 1910, and Serial Number 604,331, filed January 23, 1911, and in Eastwood's Patent, No. 1,040,292, granted October 8, 1912. In these applications and in this patent, particularly in Fig. 2, is shown a switch which has the peculiar characteristic of locking open when the current in its operating winding rises above a certain value, and of closing its contacts when the current in its operating winding decreases to or below that value. Furthermore, the adjustment of the switches $S'$, $S^2$, and $S^3$ is such that the locking-out value of current for the switch $S'$ is higher than the locking out value of current for the switch $S^2$, which in turn is higher than that for the switch $S^3$. These locking out values are illustrated diagrammatically in Fig. 3, wherein the ordinates represent current and the abscissæ time. As shown, $I'$, the locking out value of the switch $S'$, is higher than $I^2$, the locking out value of the switch $S^2$, which is higher than $I^3$, the locking out value of the switch $S^3$.

The operation of this controller is as follows: Closing the line switch S completes the motor circuit from the positive through the armature A, the field F, the windings $c^3$, $c^2$, $c'$, and the resistance sections $R'$, $R^2$, $R^3$, to the negative. The current being limited only by the resistance of the circuit rises at once to its maximum value represented by I in Fig. 3. Consequently, all the resistance switches are locked to the open position. After a while, due to the acceleration of the motor, the current in the motor circuit diminishes to the value $I'$, at which the resistance switch $S'$ is adjusted to operate, whereupon the said switch closes its contacts and short-circuits resistance section $R'$, which causes another rush of current in the motor circuit, but as the speed of the motor increases the current decreases until the speed is such that the current falls to the value $I^2$, at which the switch $S^2$ is adjusted to operate. At that moment the switch $S^2$ will close its contacts, short-circuit the resistance section $R^2$ and also short-circuit the operating winding $c'$ of the switch $S'$ which will drop to the open position. The operation of the switch $S^2$ causes another rush of current in the motor circuit which locks the switch $S^3$ to the open position, but as the motor accelerates the current decreases, and when it reaches the value $I^3$, at which the switch $S^3$ is adjusted to operate, the said switch will close its contacts, short-circuit the last resistance section $R^3$ and also the operating winding $c^2$ of the switch $S^2$ which drops to the open position. Another rush of current flows in the circuit and the said current diminishes gradually to its normal load value $I^4$. The circuit is now traced from the positive through the armature of the motor A, the field F, and the operating winding $c^3$ of the switch $S^3$, to the negative. It will be seen that owing to the different value of the locking current of the switches $S'$, $S^2$, $S^3$, the said switches will always operate in a proper sequence with a rapidity governed by the load on the motor.

To stop the motor, the switch S is opened, whereupon the motor circuit is opened, the winding $c^3$ is deënergized, and the switch $S^3$ drops to the open position.

Referring now to Fig. 2, one contact of the switch $S^3$ is connected directly to the negative as in Fig. 1, but the second contact, instead of being connected to the upper terminal of the winding $c^3$ is connected to the lower terminal thereof. It follows that, when the switch $S^3$ closes its contacts, it also short-circuits its own operating winding $c^3$ and would drop were it not for a holding winding $H^3$, one end of which is connected to the positive and the other to the bridging piece of the switch $S^3$. It follows that, when the switch $S^3$ is closed, the holding circuit through the winding $H^3$ is energized and the said switch maintained in the closed position. Except as to the action of the switch $S^3$ just described, the operation of the system shown on Fig. 2 is the same as that shown on Fig. 1.

It will be evident to those skilled in the art that my controller can be used for the control of a shunt motor, and that reversing switches may be provided in case it is necessary to reverse the rotation of the motor.

I claim—

1. In a motor control system, a motor circuit, a motor, resistances therefor, switches for controlling said resistances adapted to close in a predetermined order, and windings for operating and holding said switches closed, energized simultaneously and connected in series in the motor circuit.

2. In a motor control system, a motor circuit, a motor, resistances therefor, switches for controlling said resistances, operating windings therefor all connected in series and energized by the current in the motor circuit, and connections whereby each switch except the first to operate short-circuits the operating winding of the next preceding switch.

3. In a motor control system, a motor circuit, a motor, resistances therefor, switches arranged to close in a definite order for controlling said resistances, operating windings therefor all connected in series and energized by the current in the motor circuit, and connections whereby each switch except the first to operate short-circuits the operating winding of the next preceding switch.

4. In an electric motor system, a motor, resistances therefor, resistance-controlling switches, windings connected in series and energized simultaneously for closing said switches and holding them closed, and means including connections for closing the switches in automatic progression.

5. In an electric controller, a circuit, a resistance in the circuit, a series of switches for controlling the resistance, operating windings for the switches energized by current in the circuit and all connected in series with one another, each winding being deënergized by the closure of the succeeding switch, and connections for causing the switches to close in a predetermined order.

6. In an electric controller, a circuit, a resistance, a plurality of switch-controlling windings, means for connecting the resistance and the windings in series in the circuit, and means including initially open switch contacts closable by the said windings for causing the said contacts to close in a predetermined order.

7. In an electric controller, a circuit, a resistance therefor, a series of switches for the resistance adapted to close in a predetermined order and all connected in series with one another, operating windings for the switches adapted to be connected in the circuit, and connections whereby each switch except the first to close short-circuits a portion of the resistance and deënergizes the operating winding of the preceding switch in the series.

8. In an electric controller, a circuit, resistance therefor, a plurality of switches arranged to close in a predetermined order for controlling the resistance, operating windings therefor, main contacts for connecting all the switch windings and the resistance in series in the circuit, and connections whereby each switch except the first to operate short-circuits a portion of the resistance and the operating winding of the preceding switch, leaving its own winding in the circuit.

Signed at Cleveland, Ohio, this 26th day of October, A. D. 1911.

JAY H. HALL.

Witnesses:
R. H. BENNETT,
H. M. DIEMER.